United States Patent Office 3,146,107
Patented Aug. 25, 1964

3,146,107
CLARIFYING BEVERAGES
Max E. Elder, Carl Moore, and William F. Tousignant, Midland, Mich., assignors to The Dow Chemical Company, Midland, Mich., a corporation of Delaware
No Drawing. Filed June 30, 1961, Ser. No. 120,953
6 Claims. (Cl. 99—28)

The present invention concerns the treatment of various essentially clear or limpid beverages to improve their clarity and transparency or translucency by treatment with a water-insoluble oxazolidinone-, oxazinidinone- or oxazepidinone-substituted resinous polymer.

Many essentially clear limpid beverages, or beverages intended to be of an essentially clear or limpid character, are liable to be obtained in their as-manufactured state with some degree of haziness or cloudiness that persists despite filtration, or to develop such a condition upon standing or being chilled, or both. It is quite common, of course, for beverages to be stored, sometimes under refrigeration, after their manufacture. Besides, they are frequently chilled prior to consumption to enhance their palatability. Such haziness, including "hazing on standing" and "chill haze," occurs frequently in the several essentially clear or limpid beverages, both non-alcoholic and alcoholic in nature, and whether or not sweetened or carbonated, that are derived from various grains, fruits, berries and vegetables or mixtures thereof. In addition, many beverages are often carbonated, either by natural or artificial means, and may be artificially sweetened with sugar or other saccharine materials.

It would be advantageous, and it is the chief aim and concern of the present invention, to provide new and highly efficacious agents for the treatment of essentially clear beverages that would be capable of coagulating and precipitating therefrom the water-soluble or otherwise efficiently dispersible colloidal pectins, tannins and other dark colored soluble and partially soluble or otherwise dispersible substances that are responsible for producing the hazing phenomena in the beverage. It would be a corollary advantage of commensurate magnitude, and it is a principal object of the present invention, to provide a process for the material clarification and stabilization against hazing of essentially clear beverages using the referred-to novel coagulating and precipitating agents. It would be additionally advantageous, and it is also an object of the invention, to provide a coagulating and precipitating agent of the described type and a process for its utilization in the clarification of beverages that would make possible, along with the achievement of the primary end, many ancillary and cognate benefits and desiderata, as hereinafter more fully delineated.

It is to be fully understood, incidentally, that the operability and utility of the present invention is neither dependent upon nor to be evaluated in the light of an exact identification or characterization of the substances or their precursors which cause hazing in beverages. The reference to them as including pectins, tannins and proteinous complexes is merely set forth upon the basis of reasonable information and belief. And, as is hereinafter demonstrated, such substances, regardless of their specific nature, are efficaciously coagulated and precipitated from beverages of the indicated type by use of the herein contemplated treating agents.

It has now been discovered that the above-mentioned substances which are responsible for producing the hazing phenomena in beverages can be removed by contact with and preferably by passage through a bed of a water-insoluble polymeric 2-oxazolidinone, 2-oxazinidinone or 2-oxazepidinone resin at a reaction temperature between its freezing point and the highest temperature tolerable without harm by the beverage, advantageously between about 4° and about 40° C. and preferably between 20° and 30° C. Thereby the haze and turbidity-inducing ingredients and their precursors in the beverage are removed by said resin particles, and the treated beverage is recovered by mechanical separation from the resin.

The resins useful in the process of this invention are prepared by reacting an alkali metal salt of a 2-oxazolidinone, 2-oxazinidinone or 2-oxazepidinone having the formula:

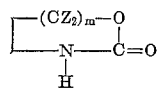

wherein Z is independently selected from the group consisting of H, alkyl groups having 1 to 4 carbon atoms and aryl groups having 6 to 10 carbon atoms and $m$ is an integer from 2 to 4, and wherein only one aryl substituent group may be present, with a chloromethylated vinylaryl polymer having 0.75 to 1.5 chloromethyl groups per available aryl nucleus, crosslinked with between 0.9 and 5 mole percent, vinylaryl polymer basis, of a crosslinking agent having two non-conjugated vinylidene groups, in stoichiometric or substantially stoichiometric proportions until at least 60% of the benzylic chloride is replaced by an oxazolidinone, oxazinidinone or oxazepidinone group, as specified.

The reaction may be represented as follows:

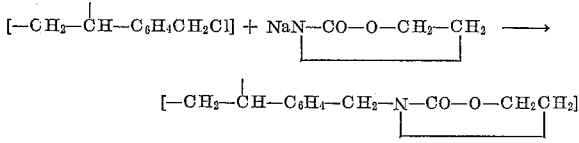

wherein the first reactant represents a polymeric vinylbenzyl chloride and the second reactant represents an equivalent amount of 3-sodio-2-oxazolidinone.

Chloromethylated vinylaryl polymers can be prepared by known procedures for use in the above resin-forming reaction by chloromethylating polymers of styrene, o-, m- and p-methylstyrenes, o-, m- and p-ethylstyrenes, vinylxylene, vinylnaphthalene, vinylanthracene, their mixtures, homologs and analogs, wherein such crosslinking agents are combined as divinylbenzene, divinyltoluene, divinylxylene, divinylethylbenzene, divinylnaphthalene, diacrylate esters, dimethacrylate esters, diallyl esters, methylene bisacrylamide, etc.

Alternatively, the chloromethylvinylaryl monomers corresponding to the polymers previously listed, e.g., o-chloromethylstyrene, together with crosslinking agent can be polymerized in mass or in a suspension medium to give products similar to the preceding polymers. The preparation of resins useful in the process of this invention is given in detail in U.S. patent application Serial No. 114,302, filed June 2, 1961.

In practice, the beverage to be treated is contacted batchwise or in a columnar operation with the air-dried, water-wet or water-swollen water-insoluble resin beads or particles of the resins described above, with or without agitation, at a temperature between the freezing point of the beverage and 40° C., preferably at room temperature, and the beverage is mechanically separated from the insoluble resin. For greater contact the resin beads or particles can be comminuted to increase surface area. Preferably, the beverage to be treated is passed through a bed of the water-insoluble resin beads and the clarified beverage is collected as effluent. In the process the haze-producing substances and their precursors are removed by the resin. The beverage may be treated at any desired stage of its manufacture or processing. With beer, for example, the treatment may be carried out when it is being racked down from the fermenters or prior to storage in the cold cellars.

Because the resins used are insoluble in the beverages being treated, no deleterious materials are added to said beverages. A simple use test indicates the flow rate of a beverage through a given resin bed column or the contact time required, for the removal of haze-producing substances. With a one-inch resin column used to treat beer, the flow rate can be varied advantageously from about 0.1 to 10 gallons per minute per square foot.

The breakthrough point, when haze-producing substances or their precursors appear in the effluent after the resin has been loaded with haze-producing substances, can be determined by continuous turbidimeter measurements, or by adding a minor amount, ca. 20 volume percent, of a 0.1 weight percent aqueous solution of water-soluble resinous polymeric N-vinyl-2-oxazolidinone or its 5-methyl homolog, having a Fikentscher K-value between 10 and 100 (Cellulosechemie 13:60) to resin bed effluent and observing whether a precipitate forms. Haze-producing substances form a precipitate with such water-soluble resinous polymeric N-vinyl-2-oxazolidinones.

As has been indicated, any essentially clear or limpid beverage, or one intended to be of such character, may be benefitted by treatment in accordance with the present invention. Typical of such beverages there may be mentioned beer, ale, porter, the various grape and other fruit or berry wines, champagne, sake, brandy, whisky, gin, vodka, cider (sweet or hard), such unfermented fruit juices as apple juice, grape juice, prune juice and the like, cranberry juice and other clear berry juices, sweet or so-called "soft" drinks (both carbonated and non-carbonated, either before or after carbonation) and other similar beverages that are desired to be obtained and used in a transparent or translucent, haze-free condition.

The following example describes completely a representative specific embodiment of the process claimed herein and sets forth the best mode contemplated by the inventors of carrying out their invention.

*Example*

A representative oxazolidinone resin useful in the practice of this invention was prepared as follows: Into a 2-liter resin kettle was charged 1610 g. (16 moles) of 5-methyl-2-oxazolidinone (OM). To this solution was added portion-wise with stirring at 50–100° C., 48.0 g. (2.08 moles) of sodium. This addition required about 2 hours. Thirty minutes after the last sodium addition, 305.0 g. (2.0 moles) of chloromethylated 1% divinyl-benzene-crosslinked (50–100 mesh) polystyrene beads was added. The suspension of these beads in OM was stirred for 8 hours at 100° C. After the reaction, the beads were filtered off from the OM and washed with water until free of chloride (acidified AgNO$_3$ test). Analysis of these ivory-colored beads gave: 0.9% Cl (initial Cl was 20.65%, which corresponds to an 89% chloromethylated bead). Thus, percent conversion of Cl was $$\frac{19.75}{20.65} \times 100 = 95.7\%$$

The nitrogen analysis gave 5.8% N$_2$. The moisture content was 31.4%. The above beads were used to clarify raw beer obtained from the Frankenmuth, Michigan, Carling Brewery as follows: A glass column was set up which contained 68.6 g., air-dried basis, of the beads obtained as described above. The resulting bead bed was 1 inch in diameter and 12 inches high. This gave a bed volume of approximately 153 cubic ml. A sample of the raw beer was passed through this column at a rate of 4 ml./min. The effluent beer was tested for clarification and chillproofing by the following methods.

(1) To a 20 ml. sample of beer, 5.0 ml. of 0.1% aqueous polymeric resinous N-vinyl-5-methyl-2-oxazolidinone (PVO–M) solution is added. This gives a 0.02% concentration of PVO–M. If the effluent sample is chillproofed, no cloudiness will develop upon the addition of the PVO–M. When the addition of PVO–M causes a cloud to form this then is taken as the breakthrough point and the resin bed is exhausted.

(2) To further support the above test, samples of effluent are frozen then allowed to melt in order to determine whether on melting they have been chillproofed. It is found that at about the point where the beer is no longer chillproofed, this also is the point where cloudiness starts showing up in the PVO–M test described above.

Using the above tests, it was found that the breakthrough point occurred after 5500 ml. of raw beer had passed through the resin bed of the example. Thus, 68.6 g. of resin beads was able to effectively clarify 5500 ml. of beer. Therefore, 1.0 lb. of beads can treat 9.6 gallons of beer. At this point the exhausted beads can be regenerated by elution with any of the following reagents; (a) dilute, ca. 2.5%, bleach (NaOCl) solutions; (b) dilute, ca. 4%, acetic acid (vinegar); (c) dilute, ca. 5%, ammonia solutions.

Substantially equivalent results are obtained when corresponding alkyl and/or aryl substituted oxazolidinone, oxazinidinone and oxazepidinone resins are substituted for the resin used above.

To indicate the probable character or nature of the ingredients that are coagulated and precipitated from beverages by the process of this invention, a series of aqueous solutions of various natural products and chemicals was treated with minor proportions, ca. 0.02 weight percent, of water-soluble resinous polymeric N-vinyl-2-oxazolidinone (PVO) and the polymeric 5-methyl homolog, PVO-M, to observe whether or not precipitation would occur. The liquids treated and the results obtained are set forth in the following tabulation, wherein the symbol "X" indicates formation of a precipitate and a blank space indicates no result.

| Aqueous Liquid Treated | Precipitating Agent | |
|---|---|---|
| | PVO | PVO-M |
| Beverages: | | |
| Tea | X | X. |
| Strawberry Juice | X | X. |
| Apple Juice | X | X. |
| Wine | X | X. |
| Beer | X | X. |
| Grape Juice | X | X. |
| Chemicals: | | |
| Lactic Acid | | |
| Citric Acid | | |
| Tartaric Acid | | |
| Tannic Acid | X | X. |
| Indole-3-Acetic Acid | X | X. |
| Indole-3-Propionic Acid | X | X. |
| Indone Butyric Acid | X | X. |
| n-Caprylic Acid (in 50% ethanol) | | |
| Miscellaneous: | | |
| Pectin | X | X. |
| Saponin | X | |
| Agar Agar | X | |
| Hydrolyzed Vegetable Protein | X | |

From the foregoing it would appear that the haze-inducing ingredients and their precursors that are precipitated by N-vinyl-2-oxazolidinone polymeric agents, like those precipitated by the resinous water-insoluble polymers used in the process of this invention, are probably more likely to be pectins, tannins or proteinous complexes than unmodified proteins or carbohydrates.

What is claimed is:

1. Process for treating substantially clear beverages to clarify them and render them stable to haze formation by contacting the said beverage with a particulate resinous copolymer of about 0.9 to 5 mole percent of a cross-linking agent having two vinylidene groups and a balance of ar-vinylbenzyl moieties having attached to benzylic carbon atoms substituent groups of the formula:

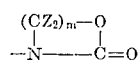

wherein Z is independently selected from the group consisting of H, alkyl groups having 1 to 4 carbon atoms and aryl groups having 6 to 10 carbon atoms, not more than one Z being such an aryl group, and $m$ is an integer from 2 to 4, said resinous copolymer being present in amount sufficient and for a time sufficient to remove haze-inducing substances and their precursors from said beverage, and separating said beverage from said resinous copolymer.

2. The process of claim 1 wherein the beverage is passed through a bed of the resinous particles as claimed in claim 1.

3. The process of claim 2 wherein said resinous copolymer is that of 3-(ar-vinylbenzyl)-5-methyl-2-oxazolidinone and 0.9 to 5 mole percent of divinylbenzene.

4. The process of claim 2 wherein said beverage is beer.

5. The process of claim 2 wherein said beverage is an unfermented fruit juice.

6. The process of claim 2 wherein said beverage is a wine.

References Cited in the file of this patent

UNITED STATES PATENTS

| | | |
|---|---|---|
| 2,667,417 | Delmousee et al. | Jan. 26, 1954 |
| 2,754,212 | Wiseman | July 10, 1956 |
| 2,818,399 | Drechsel | Dec. 31, 1957 |
| 2,873,192 | Walles et al. | Feb. 10, 1959 |
| 2,947,633 | Perry et al. | Aug. 2, 1960 |
| 3,033,830 | Tousignant et al. | May 8, 1962 |
| 3,080,344 | Walles et al. | Mar. 5, 1963 |